(12) United States Patent
Firestone

(10) Patent No.: US 8,327,897 B2
(45) Date of Patent: Dec. 11, 2012

(54) AUTOMATIC TIRE SEALING AND INFLATING SYSTEM

(76) Inventor: David A Firestone, Piscataway, NJ (US)

( * ) Notice: Subject to any disclaimer, the term of this patent is extended or adjusted under 35 U.S.C. 154(b) by 1054 days.

(21) Appl. No.: 12/156,575

(22) Filed: Jun. 3, 2008

(65) Prior Publication Data
US 2009/0294005 A1  Dec. 3, 2009

(51) Int. Cl.
*B60C 19/12* (2006.01)
*B60C 23/10* (2006.01)

(52) U.S. Cl. .................. 152/509; 152/415; 340/442

(58) Field of Classification Search .......... 152/509, 152/502; *B60C 19/12, 23/10*
See application file for complete search history.

(56) References Cited

U.S. PATENT DOCUMENTS

| | | | |
|---|---|---|---|
| 2,991,629 A | 7/1961 | Rose | |
| 3,448,779 A | 6/1969 | Horwitt | |
| 3,843,586 A | 10/1974 | Wolf | |
| 3,942,573 A * | 3/1976 | Lawrence et al. | 152/503 |
| 4,582,108 A * | 4/1986 | Markow et al. | 152/418 |
| 4,612,798 A | 9/1986 | Roberts | |
| 5,305,784 A | 4/1994 | Carter | |
| 5,338,776 A | 8/1994 | Peelor et al. | |
| 5,403,417 A | 4/1995 | Dudley et al. | |
| 5,500,456 A | 3/1996 | Hughett et al. | |
| 5,765,601 A | 6/1998 | Wells et al. | |
| 5,908,145 A | 6/1999 | Jaksa | |
| 5,909,752 A | 6/1999 | Gerresheim et al. | |
| 5,928,444 A * | 7/1999 | Loewe et al. | 152/418 |
| 6,176,285 B1 * | 1/2001 | Gerresheim et al. | 152/509 |
| 6,431,225 B1 | 8/2002 | Dudley | |
| 6,605,654 B1 | 8/2003 | Fang et al. | |
| 7,690,411 B2 * | 4/2010 | Wilson | 152/415 |
| 2006/0220814 A1 * | 10/2006 | Kawashima | 340/442 |
| 2008/0060734 A1 * | 3/2008 | Stehle | 152/416 |
| 2008/0210708 A1 * | 9/2008 | Yeames | 222/61 |
| 2010/0032069 A1 * | 2/2010 | Muller | 152/503 |

FOREIGN PATENT DOCUMENTS

| | | | |
|---|---|---|---|
| DE | 102004042911 | * | 3/2006 |
| JP | 08-048119 A | | 2/1996 |
| JP | 3099303 B | * | 10/2000 |
| KR | 20-2001-000235 U | | 12/2001 |
| KR | 10-2002-0088465 A | | 11/2002 |
| WO | WO 2007045435 A1 * | | 4/2007 |

* cited by examiner

*Primary Examiner* — Justin Fischer
*Assistant Examiner* — Philip N Schwartz
(74) *Attorney, Agent, or Firm* — Ash Tankha; Lipton, Weinberger & Husick

(57) ABSTRACT

Sealing and inflating system incorporated with a vehicular wheel including a tire rim and a tire mounted to the tire rim including a source of sealing and inflating compound arranged in connection with the tire or tire rim, a detecting mechanism for detecting a rupture in the tire, and a release mechanism coupled to the source and the detecting mechanism for releasing a quantity of the sealing and inflating compound from the source when the detecting mechanism detects a rupture in the tire. The source, detecting mechanism and release mechanism can all be arranged in the pressurized interior space defined by the tire and the tire rim. In this case, the source can be attached to the tire rim. One such construction of the source has two substantially semi-circular parts arranged around the tire rim and connected together, with a release mechanism being arranged in engagement with each part.

15 Claims, 3 Drawing Sheets

AUTOMATIC TIRE SEALING AND INFLATING SYSTEM

FIELD OF THE INVENTION

The present invention relates to a system and method for directing a seating and inflating compound into a tire having a rupture or tear for the purpose of sealing the rupture or tear and then inflating the thus-sealed tire.

The present invention also relates generally to a vehicle-mounted system for directing a sealing and inflating compound into a tire having a rupture or tear for the purpose of sealing the rupture or tear and then inflating the thus-sealed tire. More specifically, the present invention also relates to a tire-mounted system for directing a sealing and inflating compound into a tire having a rupture or tear for the purpose of sealing the rupture or tear and then inflating the thus-sealed tire.

BACKGROUND OF THE INVENTION

Currently available pneumatic tires are designed to perform for relatively long periods of time. In many cases, automobile tires are now expected to have a useful service life of 30,000, 50,000 or 70,000 miles. However, even long-life pneumatic tires are subject to failure due to puncture by nails and other sharp objects.

In response to consumer distress over flat tires and the associated ordeal of changing the damaged tire, tire sealant and inflator compositions together with associated delivery devices have been developed. The inflator and sealant compositions are typically packaged in a relatively small metal container of the type known to consumers as an "aerosol can". The inflator and sealant compositions generally include a condensed, i.e. 'liquified', gas containing a glue-like sealant material. A sufficient quantity of condensed gas is typically provided in the container so that as the liquid changes state to a gas upon discharge from the interior of the container into a flat tire, it expands with sufficient volume and force to re-inflate the tire to a drivable condition. At the same time, the glue-like sealant material is distributed onto the interior surface of the tire and "finds" the puncture in the tire because of pressurized gas leaking through the puncture. This, in turn allows the sealant material to react with air and seal the puncture.

Since these self-contained tire inflating and sealant products are portable and can be stored in a vehicle's trunk for use in an emergency, and because many of these devices have proven reliable and relatively easy to use, the devices have achieved enormous commercial success, with sales amounting to millions of dollars annually. In a relatively short period of time these devices have generated an industry, such that numerous companies presently manufacture and supply large quantities of portable tire inflating products. These products are regularly stocked in a wide variety of retail stores throughout the United States and other countries.

Over the years, various changes have been made in inflator and sealant compositions.

Substantial changes have also been made to the delivery systems for discharging the inflator and sealant compositions into damaged tires. One delivery system that has been sold with considerable commercial success is known in the trade as the "cone top" system. The cone top system includes a cone shaped actuator assembly, typically formed of a plastic or another relatively rigid material, mounted onto the container holding the inflator and sealant composition under pressure. This actuator is positioned over the conventional valve stem of the container which controls release of the materials from the container. The cone-shaped actuator extends upwardly from the end of the pressurized container and terminates at an exterior end configured for attachment to the valve stem of a pneumatic tire. The cone top actuator also includes an internal valve linkage assembly that mechanically connects the interior of the container to the interior of the tire as the delivery end of the actuator is connected to valve stem of the tire by simultaneously opening both the aerosol valve and the tire valve.

The cone top tire inflating dispensing systems, and similar mechanical linkage dispensing systems, are found in practice to suffer from various problems. For example, these dispensers can be difficult for the consumer to use because of the amount of turning required to connect the container to the tire, and container leakage due to various problems can also be problematic. For example, the minor difference in shape between the aerosol valve pedestal (on the top of the container body) and the inner surface of the cone top actuator, can cause leakage within the actuator nozzle during the actuation cycle. In some cases, the press fit connection between the skirt of the actuator and the metal crimp on the container body can be too loose with the result that the actuator cannot be threaded onto the tire valve. In other cases, cross-threading of the actuator top onto the tire valve complicates or prevents removal of the actuator from the tire valve following use of the product. In addition, because the actuator nozzle is rigid, relatively short and wide, it cannot readily be attached to valve stems found on some configurations of tires and wheels, e.g., spoked wheels, or wheels with spoked covers.

Still further, because of the inflexible construction of the automatically acting dispensing systems, and because the pressurized containers are designed for use in a predetermined orientation, either upright or inverted, proper use of the product requires the stem of a flat tire be oriented within a relatively narrow range of acceptable positions. Operation in the predetermined orientation is required because aerosol-type containers, including those used to dispense inflator and sealant materials, are normally designed to dispense materials from either the top or bottom of the container. Tire inflator products designed to dispense from the bottom of the container include a dip tube extending from the interior end of the container valve body downwardly into a lower portion of the pressurized container and dispense the condensed gas and sealant from the pressurized container when the pressurized container is held in an upright position. Products designed to dispense from the top of the container include relatively short dip tubes which terminate in an upper portion of the pressurized container, or do not have a dip tube, and dispense the condensed gas and sealant from the pressurized container when the pressurized container is held in an inverted position. In either case, if the container is held in the wrong position when the valve is actuated, headspace gas can be dispensed instead of a gas-concentrate mixture of the inflator and sealant compound.

Accordingly, the pressurized container must be properly oriented, according to instructions on the can body, in order that the condensed gas and sealant be properly dispensed. The rigidity of the nozzle of the automatic, mechanical linkage type dispensing systems, however, requires that the container body be oriented in the direction of the tire's valve stem as the nozzle is attached to the tire. In turn, this requires that the valve stem of the tire be properly positioned facing either upwardly or downwardly so that the container can be properly oriented as directed on the container. However, some consumers do not read and/or follow directions for the tire inflating devices and, consequently, do not properly position the valve stem of the flat tire to allow proper operation of the container. In other cases, consumers either will not or are hesitant to move a vehicle having a flat tire in order to properly position the valve stem of the deflated tire to allow proper operation of the tire inflating device.

Due to these and other problems, the majority of the tire inflating products are now sold in combination with conduit-type dispensing stems which were first introduced in about the early 1980's. The conduit-type actuators used in these products employ a side oriented actuator overlying the valve stem of the pressurized container that includes an internal fluid passageway connecting the valve stem with a port in a sidewall of the actuator body. The actuator also includes a trigger tab overlying the valve stem of the container which is designed to move the valve stem to open position upon application of manual pressure thereto, by e.g. the finger or thumb of the consumer.

A relatively long flexible conduit is connected at one end to the actuator body for dispensing the discharged contents of the container. The second end of the flexible conduit includes a threaded coupling designed for attachment to the valve stem of a pneumatic tire. In separate steps, the consumer attaches the conduit to the valve stem of the tire, and then depresses the trigger of the actuator to initiate discharge of the inflator and sealant composition into the tire. In view of the long conduit, attachment of the device to valve stems of spoked wheels is easier. The long flexible conduit also allows the container to be maintained in the proper orientation, (normally upright), regardless of the orientation of tire's valve stem. These tire inflating products have also been found in practice to substantially reduce the leakage problems associated with the automatically acting cone top dispensers.

The benefits associated with the conduit-type tire inflator products have been substantial and have resulted in widespread acceptance of the conduit-type products by tire inflation product manufacturers, retailers, and especially consumers. Thus, the improved reliability, the reduction in defects and leakage problems, and enhanced ease of use by the consumer, have in actual practice, apparently offset the problems of added manual labor, increased manufacturing time and costs, and the handling difficulties associated with these products.

However, one significant problem with the inflator products is that they must be manually connected to the valve stem and activated to cause the sealing and inflating compound to flow from the can through the conduit into the interior of the tire. This requires a driver to first be made aware of the presence of a punctured or ruptured tire, then stop and exit the vehicle and then retrieve the inflator product, connect it to the valve stem, activate it and then once the tire is inflated, disconnect the product from the valve stem. These steps introduce a rather large degree of labor into the sealing and inflating process.

Another problem with the inflator products described above is that as the sealant has a quality guaranteed term, after the expiration, it is condemned. Further, it is difficult to reuse an aerosol can, therefore the recycling efficiency is low. Furthermore, the propellants such as hydrocarbon propellant, chlorofluorocarbon propellant and hydrochlorofluorocarbon propellant more or less contribute to depletion of the earth's ozone layer. Recognizing a demand for a reusable container for a tire puncture sealant, a container capable of extending a quality guaranteed term, and a system being capable of injecting the sealant into a flat tire without using a propellant, prior art systems were developed. The prior art systems address this problem by providing a tire puncture sealant set comprising a bottle having a body and a threaded neck portion provided with an outlet, a puncture sealant in the bottle, an inside plug put into the outlet, an outer cap screwed onto the neck portion for covering the inside plug, an injector replaceable with the outer cap, a side wall of the body having a triple layered structure of an inner layer, an outer layer and a middle layer therebetween made of a gas barrier resin so that the body is squeezable by hand. The inside plug includes a breakable partition wall separating the inside of the bottle from the outside. The injector comprises an adapter cap screwable onto the neck portion, a sticking pipe for piercing the breakable partition wall into the inside of the bottle, and a hose for injecting the sealant into a pneumatic tire.

It would be desirable to provide a tire sealant and inflator which does not require a driver to exit his or her vehicle in order to inject a tire sealant and inflating compound into the tire to seal a rupture in the tire and then inflate the thus-sealed tire.

OBJECTS AND SUMMARY OF THE INVENTION

It is an object of the present invention to provide a new and improved system and method for directing a sealing and inflating compound into a tire having a rupture or tear for the purpose of sealing the rupture or tear and then inflating the thus-sealed tire.

It is another object of the present invention to provide a tire sealing and inflating system which is arranged on the tire.

It is yet another object of the present invention to provide a tire sealing and inflating system which is automatically actuated upon detection of rupture in the tire without requiring a driver to exit his or her vehicle to mount and actuate such a tire sealing and inflating system.

In order to achieve these objects and others, one embodiment of a sealing and inflating system incorporated with a vehicular wheel including a tire rim and a tire mounted to the tire rim comprises a source of sealing and inflating compound arranged in connection with the tire or tire rim, a detecting mechanism for detecting a rupture in the tire, and a release mechanism coupled to the source and the detecting mechanism for releasing a quantity of the sealing and inflating compound from the source when the detecting mechanism detects a rupture in the tire. The detecting mechanism and release mechanism may be arranged in connection with the tire and moreover, the source, detecting mechanism and release mechanism can all be arranged in the pressurized interior space defined by the tire and the tire rim. In this case, the source can be attached to the tire rim. One such construction of the source has two substantially semi-circular parts arranged around the tire rim and connected together, with a release mechanism being arranged in engagement with each part.

In one embodiment, the detecting mechanism is a redundant detecting mechanism including a PSI sensor arranged to detect pressure in a pressurized interior space of the tire, and a pressure release valve. The PSI sensor and pressure release valve are both coupled to a sealant release valve associated with the source and is actuated to release a quantity of the sealing and inflating compound from the source into the interior space of the tire.

The sealing and inflating compound can include fiber shavings, which be beneficial to obtain a seal for relatively large ruptures and punctures.

The system can also include a regulating mechanism for preventing the release mechanism from being actuated before the pressure in the tire reaches a threshold. The regulating mechanism may be a cut-off valve, in which case a sealant flow bridge is preferably arranged around the cut-off valve.

The sealing and inflating system may be considered together with the tire and tire rim to form a wheel including the invention (as described above) or may be considered only the source, detecting mechanism and release mechanism which would be suitably adapted for attachment to the tire and/or tire rim depending on the embodiment.

A method for sealing and inflating a tire mounted on a tire rim in accordance with the invention includes arranging a source of sealing and inflating compound in connection with the tire, then detecting a rupture in the tire and then actuating a release mechanism coupled to the source to release a quantity of the sealing and inflating compound from the source into an interior space of the tire. In one embodiment, the method also includes notifying a driver of the vehicle about the detected rupture of the tire and then detecting when speed of the vehicle is below a threshold. The release mechanism can thus be actuated only after the speed of the vehicle is below a threshold. The various locations and constructions of the source and release mechanism and devices for detecting the rupture in the tire described above can be implemented in the method as well.

In systems in accordance with the invention, the driver does not have to exit his or her vehicle to retrieve a can of sealing and inflating compound, connect such a can to the valve stem, activate the can, remove the can once the tire is inflated or place the can in a storage position. Sealing and inflating of a ruptured or punctured tire is thus greatly simplified over the prior art use of sealant and inflator aerosol-type cans.

DESCRIPTION OF DRAWINGS

The following drawings are illustrative of the embodiment of the invention.

DETAILED DESCRIPTION OF THE INVENTION

Figure 1A:
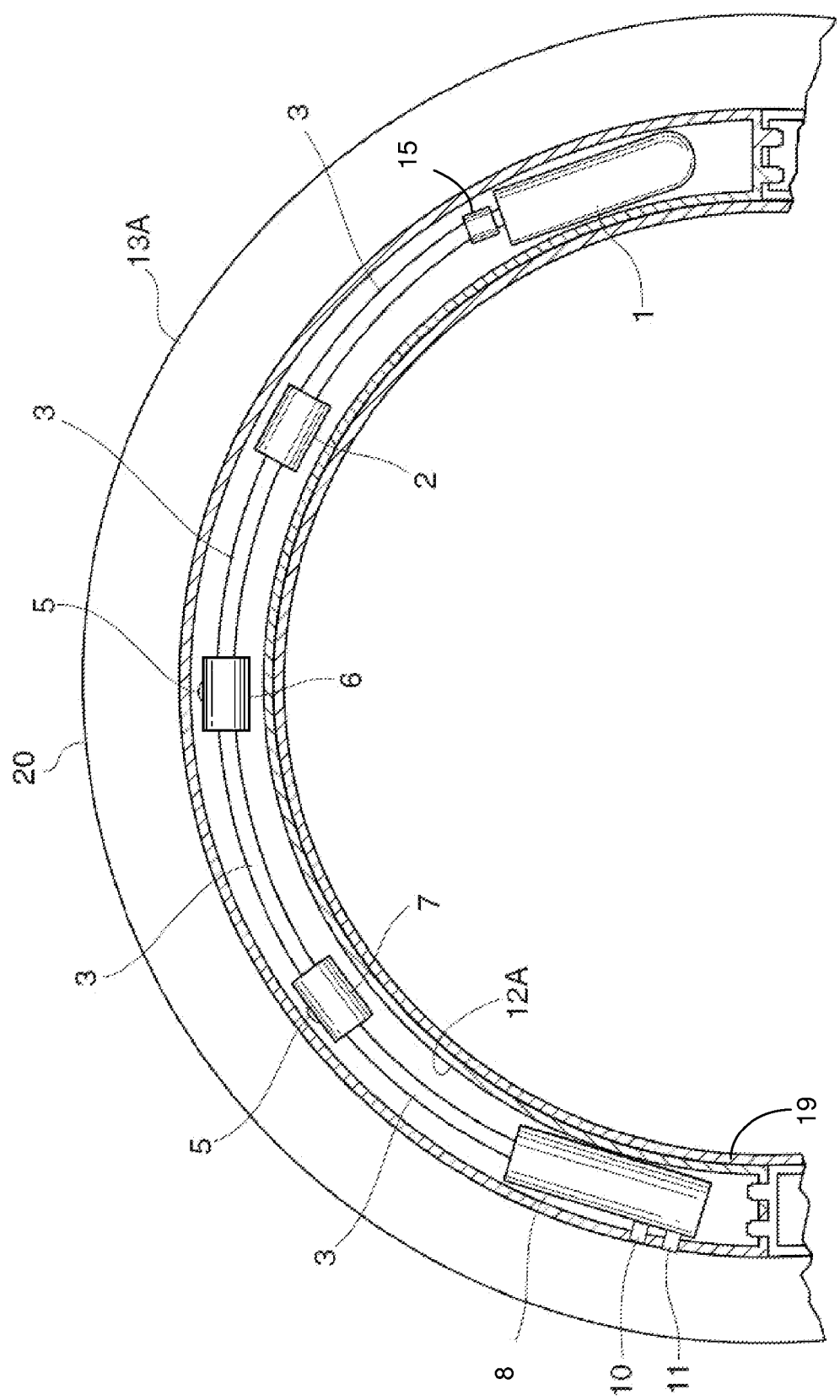
FIG. 1A is a schematic view of the principal components of a system in accordance with the invention.

Referring to the accompanying drawings to the same or similar elements, a schematic of an automatic tire sealant and inflation system in accordance with the invention, is shown in FIG. 1A and comprises a cartridge (8) comprising a sealant and a source (1) of an inflating compound which are capable of sealing a rupture of a tire (20), while also inflating the tire (20).

After the rupture is sealed, a sensor (5) for detecting the presence of a rupture is in the tire (20), a coupling (3), which couples an outlet (15) of the source (1), a trigger mechanism (6), coupled to the source (1), and a sensor (5) for initiating the flow of a sealant and an inflating compound from the cartridge (8) and the source (1), respectively, through the coupling (3), and into the tire (20).

Figure 2:
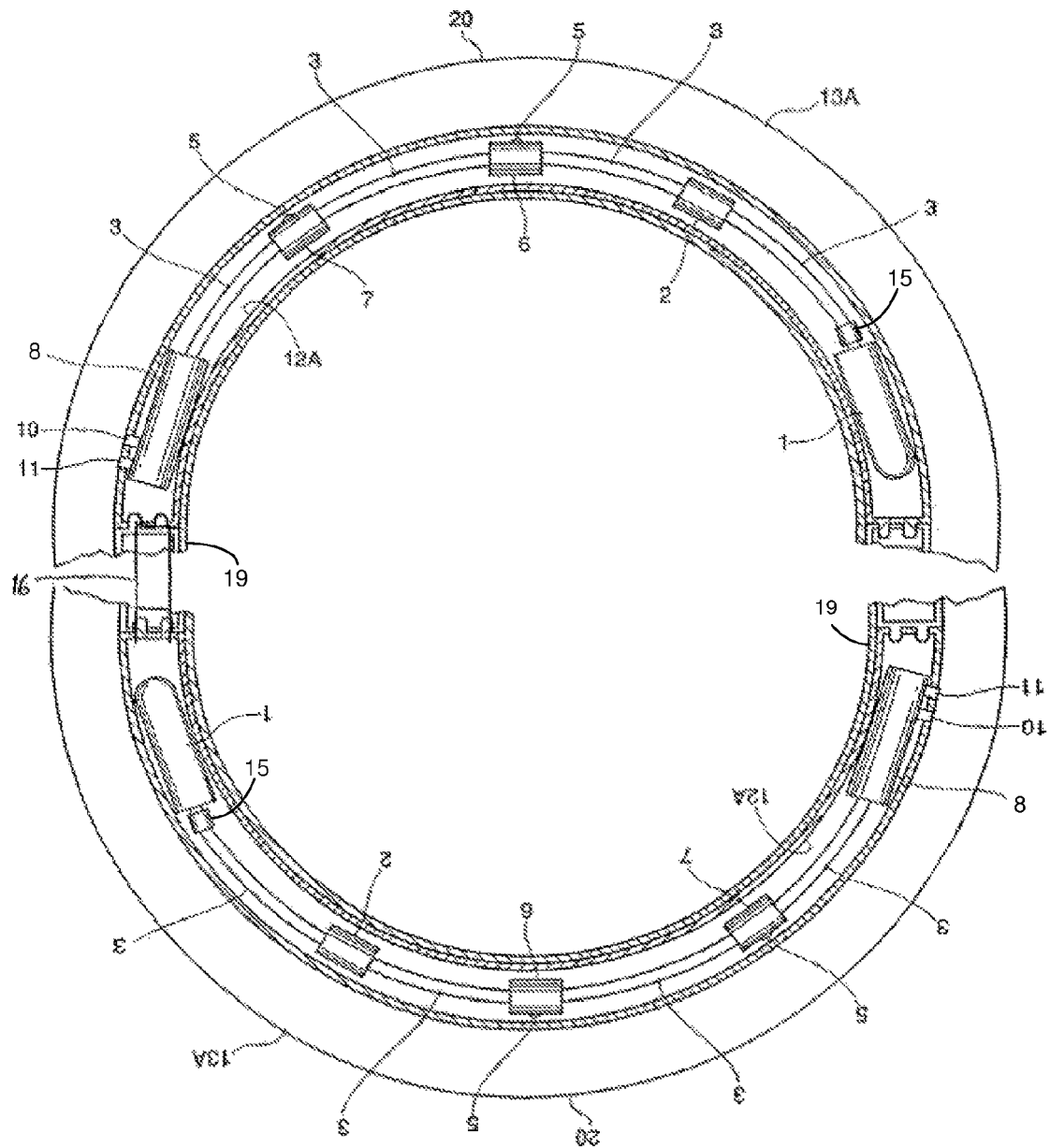
FIG. 2 is an assembled view of the embodiment of the system in accordance with the invention.

FIG. 2 shows the embodiment of the automatic tire sealing and inflation system in accordance with the invention which is designed to mount inside of the tire (20), i.e., in the pressurized interior space defined by the tire (20) and tire rim (19). System also includes a casing (12A, 13A) made of two substantially semi-circular parts, pivotally connected together at one region and lockable clamp (16) together at the other end regions, a suitable releasable or permanent locking mechanism for locking two parts together is readily designable by one skilled in the art and may include complimentary mating surfaces as shown, (12A, 13A). These may be made of plastic or another comparable or equivalent material.

Figure 3:
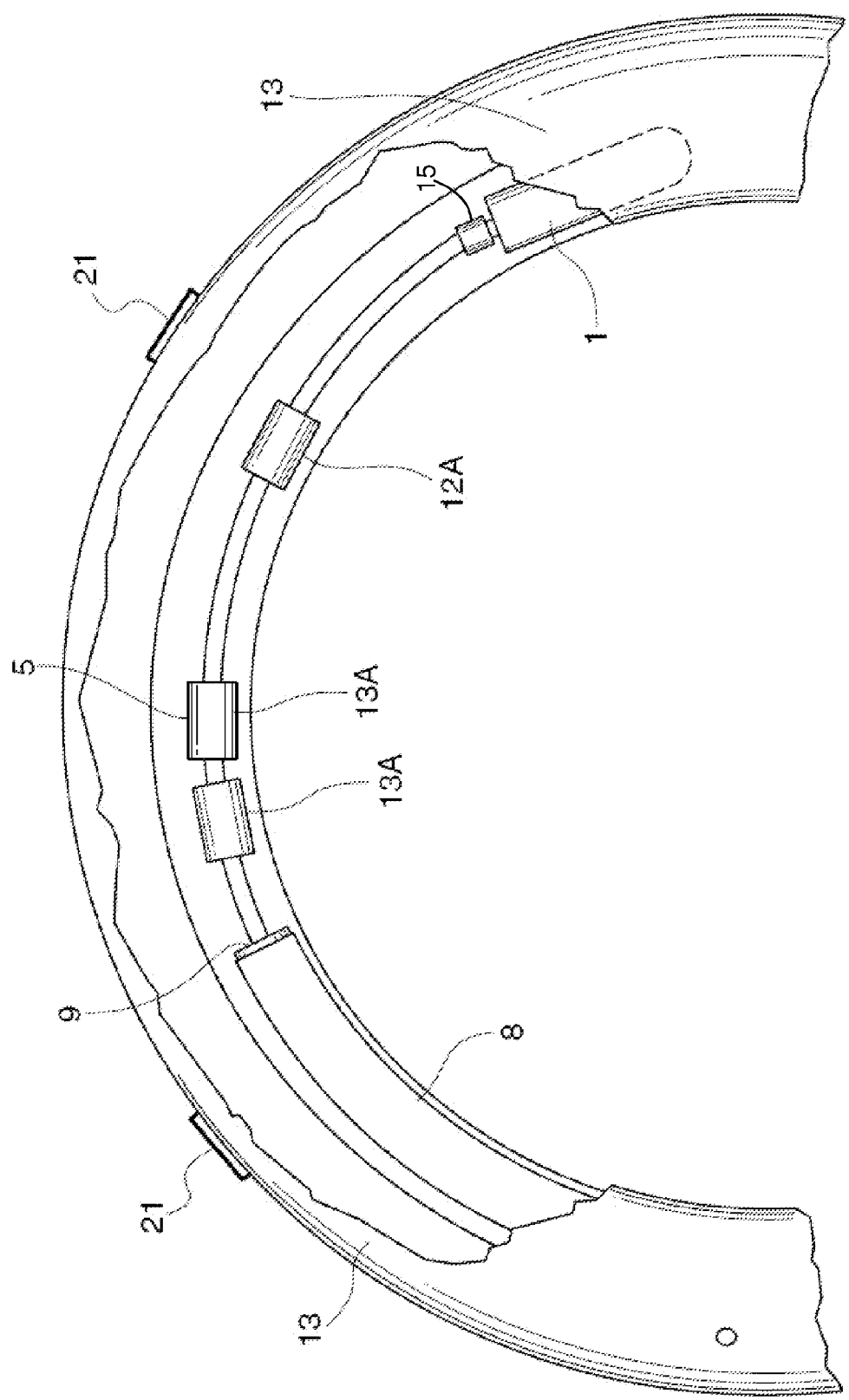
FIG. 3 is a view of the clamshell design of the system in accordance with the invention.

Each part, (12A, 13A), includes a channel (3) which includes a source of an inflating compound, for example a $CO_2$ cartridge (1) which provides air flow through the channels (3) to eventually thrust the piston (9) in the sealant cylinder (8) forward, pushing the sealant through the sealant cylinder (8) and releasing out of the sealant release holes (11) into the tire (20), thus sealing the rupture. The remaining air at this point, is released through the air release (10), to inflate tire (20) back to original psi or there about. The $CO_2$ cartridge (1) is coupled with a regulator (2), to control air flow through the channels (3). At this point, the air or gas flows through coupler (3), and through valve (6). Valve (6) is a spring return valve, which in this case, is in the normally closed position allowing air to flow through the valve. The air, nitrous or gas, travels through valve (6), through the coupler (3), to valve (7). Valve (7), is a detented valve in the normally closed position, which restricts air flow. At this point, with the system (12A, 13A) in the tire and mounted around the inner rim, inflation of the tire (20) may begin. As inflation of tire (20) begins, at a pre-determined pressure, the pressure sensor (5) on the spring return valve (6) will actuate closing the spring return valve (6) restricting any further air flow through the spring return valve (6). Almost simultaneously, (at a pre-determined pressure), pressure Sensor (5) on detented valve (7) will actuate, opening the detented valve (7) to allow air to flow through the detented valve (7). The system will remain in this state until rupture of tire (20) occurs. The clamshell system, (12A, 13A), will have counter weights attached (FIG. 3) (21) for wheel balancing purpose.

When a rupture occurs, pressure decreases in the tire (20). When the pressure reaches a pre-determined pressure (psi), spring return valve (6) will release air restriction, (actuated by spring return), allowing air to flow through the valve (6), then through detented valve (7), through the coupler (3), to sealant cylinder (8). The air flow thrusts the piston (9) through the sealant cylinder (8), causing sealant to disburse into tire (20) through sealant release hole (11). Sealant release hole (11) and air release hole (10), is covered with a durable film until pressure breaks the film to release fluid and the air. After sealant is disbursed into tire (20), sealing the rupture, air will continue to flow through air release hole (10), until $CO_2$ (1) is depleted, thus, filling tire to its original pressure (psi) or there about. Only pressure differences above a threshold may cause release of the sealant and the inflation compound.

The system may also include a pressure monitoring system similar to other systems in the market. However, the wireless radio transmitter system is located between the locking clamshell structure of the system (FIG. 2) (16) which notifies the operator of the vehicle that a rupture has occurred.

The top of the clamshell (FIG. 3) (13), is retractable (open and close) so channels and components of the system (12A, 13A) (FIG. 3) can be placed into molded compartments and sealant can be re-inserted when depleted. Sealant cylinders may be made available for this application. With the application of this invention, an important advantage is achieved. By means of this installation in that the requirement for the driver to exit his or her vehicle and manually couple a stand-alone tire inflator and sealant apparatus, such as the tire jack™ and fix-a-flat™ apparatus, to the tire is entirely eliminated. Using the prior art stand-alone tire inflator and sealing apparatus, the driver was required to first detect the presence of a rupture in the tire evidenced through a flat tire, such as through noticeable abnormal operation of a vehicle, and then stop the vehicle, couple the apparatus to the tire via the valve stem and then activate the apparatus to cause the flow of sealant and inflating compound into the interior of the tire.

The invention is fully automatic in that the sensor (5) is designed to detect the presence of a rupture which will lead to a flat tire, notify the driver to enable or slow down the vehicle at which point the system will automatically direct sealant and inflating compound into the tire to seal the rupture and inflate the tire. The driver can continue driving the vehicle, without ever having to exit the vehicle.

The invention claimed is:

1. A vehicular wheel assembly comprising:
a tire rim;
a tire mounted on said tire rim; and
a sealing and inflation system configured to automatically detect a rupture in said tire, seal said rupture and inflate said sealed tire, comprising:
one or two substantially semi-circular parts pivotally connected together at one end region and selectively lockable together at the other end region, wherein said substantially semi-circular parts are mounted around said tire rim in a pressurized interior space defined by said tire and said tire rim, wherein each of said one or two substantially semi-circular parts comprise:
a cylinder comprising a sealant within said cylinder, wherein said cylinder further comprises a sealant release hole and a gas release hole at one end and a piston at another end, and wherein said sealant release hole and said gas release hole are in communication with said pressurized interior space defined by said tire and said tire rim;
a cartridge comprising pressurized gas, wherein said cartridge is coupled to a regulator to control gas flow through a channel;
a detecting mechanism configured to detect said rupture in said tire;
a release mechanism coupled to said piston and said detecting mechanism, wherein said release mechanism comprises:
said channel connecting said cartridge and said piston, wherein said channel is configured to direct said pressurized gas released from said cartridge towards said piston;
a detent valve coupled to said channel and in close proximity of said cartridge, wherein said detent valve further comprises a first pressure sensor; and
a spring return valve coupled to said channel and in close proximity of said cylinder, wherein said spring return valve further comprises a second pressure sensor;
said release mechanism configured to release a quantity of said pressurized gas on detecting said rupture by said detecting mechanism, and wherein said pressurized gas is configured to thrust said piston into said cylinder for discharging said sealant through said sealant release hole for sealing said rupture;
said release mechanism configured to release said pressurized gas through said gas release hole on depletion of said sealant for inflating said sealed tire to a predetermined pressure; and
a regulating mechanism configured to prevent the release mechanism from being actuated before the pressure in the tire reaches a threshold;
wireless radio transmitter system between the lockable clamp connecting said one or two substantially semi-circular parts for notifying the operator of the vehicle on said detection of said rapture.

2. The system of claim 1, wherein said cartridge and said cylinder are refillable and replaceable for replenishing said sealant and said pressurized gas, wherein said cartridge and said cylinder are accessed by retracting said one or two substantially semi-circular parts.

3. The system of claim 1, further comprising a trigger switch arranged in connection with said sealant release hole and said gas release hole of said cylinder, said trigger switch configured to prevent actuation of said cylinder during installation.

4. The system of claim 1, wherein said first pressure sensor is configured to trigger said detent valve to open and discharge gas through the detent valve.

5. The system of claim 1, wherein said sealant comprises sealant compounds with fiber glass shavings.

6. In a vehicle with one or more vehicular wheel assemblies, a sealing and inflating system for each of said wheel assemblies, said sealing and inflating system configured to automatically detect a rupture in a tire, seal said rupture and inflate said sealed tire while an operator continues to drive said vehicle, each of said vehicular wheel assemblies comprising:
a tire rim;
said tire mounted on said tire rim; and
said sealing and inflating system, comprising:
one or two substantially semi-circular parts pivotally connected together at one end region and selectively lockable together at the other end region, wherein said substantially semi-circular parts are mounted around said tire rim in a pressurized interior space defined by said tire and said tire rim, wherein each of said one or two substantially semi-circular parts comprise:
a cylinder comprising a sealant within said cylinder, wherein said cylinder further comprises a sealant release hole and an gas release hole at one end and a piston at another end, and wherein said sealant release hole and said gas release hole are in communication with said pressurized interior space defined by said tire and said tire rim;
a cartridge comprising pressurized gas, wherein said cartridge is configured to thrust said piston into said cylinder by releasing said pressurized gas, and wherein said cartridge is coupled to a regulator to control gas flow through a channel;
a detecting mechanism configured to detect a rupture in said tire;
a release mechanism coupled to said piston, said cartridge and said detecting mechanism, wherein said release mechanism is configured to release a quantity of said pressurized gas on detecting a rupture by said detecting mechanism, and wherein said pressurized gas is configured to thrust said piston into said cylinder for discharging said sealant through said release hole for sealing said rupture in said tire;
said release mechanism configured to continue releasing said pressurized gas from said cartridge for inflating said sealed tire; and
a regulating mechanism configured to prevent the release mechanism from being actuated before the pressure in the tire reaches a threshold; and
a wireless radio transmitter system between the lockable clamp connecting said one or two substantially semi-circular parts for notifying the operator of the vehicle on said detection of said rapture.

7. The system of claim 6, wherein said cartridge and said cylinder are refillable and replaceable for replenishing said sealant and said pressurized gas, wherein said cartridge and said cylinder are accessed by retracting said one or two substantially semi-circular parts.

8. The system of claim 6, further comprising a trigger switch arranged in connection with said sealant release hole and said gas release hole of said cylinder, said trigger switch configured to prevent actuation of said cylinder during installation.

9. The system of claim 6, wherein said sealing compound comprises sealant compounds with fiber glass shavings.

10. A method to automatically detect a rupture in a tire, seal said rupture, and inflate said sealed tire, while an operator continues to drive a vehicle fitted with said tire, comprising:
providing a vehicular wheel assembly comprising:
a tire rim;
said tire mounted on said tire rim;
a sealing and inflation system configured to automatically detect a rupture in said tire, seal said rupture and inflate said sealed tire, comprising:
one or two substantially semi-circular parts pivotally connected together at one end region and selectively lockable together at the other end region, wherein said substantially semi-circular parts are mounted around said tire rim in a pressurized interior space defined by said tire and said tire rim, wherein each of said one or two substantially semi-circular parts comprise:
a cylinder comprising a sealant within said cylinder, wherein said cylinder further comprises:
a sealant release hole and a gas release hole at one end, wherein said gas release hole is located above said sealant release hole on surface of said cylinder, and wherein said sealant release hole and said gas release hole are in communication with said pressurized interior space defined by said tire and said tire rim; and
a piston at another end;
a cartridge comprising pressurized gas wherein said cartridge is coupled to a regulator to control gas flow through a channel;
a detecting mechanism configured to detect said rupture in said tire:
a release mechanism coupled to said piston and said detecting mechanism, wherein said release mechanism comprises:
said channel connecting said cartridge and said piston, wherein said channel is configured to direct said pressurized gas released from said cartridge towards said piston;
a detent valve coupled to said channel and in close proximity to said cartridge, wherein said detent valve further comprises a first pressure sensor; and
a spring return valve coupled to said channel and in close proximity to said cylinder, wherein said spring return valve further comprises a second pressure sensor:
said release mechanism configured to release a quantity of said pressurized gas on detecting said rupture by said detecting mechanism, and wherein said pressurized gas is configured to thrust said piston into said cylinder for discharging said sealant through said release hole for sealing said rupture in said tire;
said release mechanism configured to release said pressurized gas through said gas release hole on depletion of said sealant for inflating said sealed tire to said predetermined pressure; and
a regulating mechanism configured to prevent the release mechanism from being actuated before the pressure in the tire decreases to a predetermined threshold;
a wireless radio transmitter system between the lockable clamp connecting said one or two substantially semi-circular parts for notifying the operator of the vehicle on said detection of said rupture;
inflating said tire to said predetermined pressure;
actuating opening of said detent valve by said first pressure sensor, wherein said detent valve releases a quantity of said pressurized gas through said channel, and wherein said pressurized gas is blocked by said spring return valve;
detecting said rupture in said tire by said detection mechanism;
actuating opening of said spring return valve by said second pressure sensor, causing said spring return valve to release said pressurized gas, wherein said channel directs said released pressurized gas towards said piston, causing said piston to thrust into said cylinder for releasing said sealant through said sealant release hole;
sealing said ruptured tire by said sealant;
releasing said pressurized gas through said gas release hole on depletion of said sealant; and
inflating said sealed tire to a predefined pressure by continuing release of said pressurized gas into said sealed tire.

11. The method of claim 10, further comprising arranging a trigger switch in connection with said sealant release hole and said gas release hole of said cylinder, said trigger switch configured to prevent actuation of said cylinder during installation.

12. The method of claim 10, wherein said detection mechanism comprises a differential pressure switch.

13. The method of claim 10, further comprising:
detecting gas pressure in a pressurized interior space and comparing said
detected gas pressure with a predetermined threshold.

14. A vehicular wheel assembly comprising:
a tire rim;
a tire mounted on said tire rim; and
a sealing and inflating system configured to automatically detect a rupture in said tire, seal said rupture and inflate said sealed tire, comprising:
one or two substantially semi-circular parts pivotally connected together at one end region and selectively lockable together at the other end region, wherein said substantially semi-circular parts are mounted around said tire rim in a pressurized interior space defined by said tire and said tire rim, wherein each of said one or two substantially semi-circular parts comprise:
a cylinder comprising a sealant within said cylinder, wherein said cylinder comprises a piston at one end, and wherein other end of said cylinder is in communication with said pressurized interior space defined by said tire and said tire rim;
a cartridge comprising pressurized gas;
a detent valve and a spring return valve coupled together, wherein said detent valve and said spring return valve are coupled between said cylinder and said cartridge, and wherein said detent valve and said spring return valve are configured to prevent actuation of said cartridge and said cylinder during installation within said pressurized interior space;

a detecting mechanism configured to detect a rupture in said tire;

a release mechanism coupled to said piston, said cartridge and said detecting mechanism, wherein said release mechanism comprises a first pressure sensor associated with said detent valve and a second pressure sensor associated with said spring return valve, wherein said first pressure sensor and said second pressure are configured to actuate said detent valve and said spring return valve to release a quantity of said pressurized gas on detecting a rupture by said detecting mechanism, and wherein said pressurized gas is configured to thrust said piston into said cylinder for discharging said sealant through said sealant release hole for sealing said rupture in said tire;

said release mechanism configured to release said pressurized gas into said sealed tire on depletion of said sealant for inflating said sealed tire to a predetermined pressure; and a regulating mechanism configured to prevent the release mechanism from being actuated before the pressure in the tire reaches a threshold;

a wireless radio transmitter system between the lockable clamp connecting said one or two substantially semicircular parts for notifying the operator of the vehicle on said detection of said rapture.

15. The vehicular wheel assembly of claim 14, wherein said cylinder comprises a sealant release hole and a gas release hole at said other end, and wherein said release mechanism is configured to release said pressurized gas into said sealed tire through said gas release hole.

* * * * *